(12) United States Patent
Jenks

(10) Patent No.: US 10,648,691 B2
(45) Date of Patent: May 12, 2020

(54) HVAC ACTUATOR WITH CONTACTLESS ADJUSTABLE SETTINGS

(71) Applicant: Johnson Controls Technology Company, Auburn Hills, MI (US)

(72) Inventor: Russell T. Jenks, Racine, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 39 days.

(21) Appl. No.: 15/913,305

(22) Filed: Mar. 6, 2018

(65) Prior Publication Data

US 2019/0277532 A1   Sep. 12, 2019

(51) Int. Cl.
| | |
|---|---|
| *F24F 11/50* | (2018.01) |
| *F24F 11/62* | (2018.01) |
| *F24F 11/56* | (2018.01) |
| *G01D 5/14* | (2006.01) |
| *G05B 6/02* | (2006.01) |

(52) U.S. Cl.
CPC ............. *F24F 11/62* (2018.01); *F24F 11/56* (2018.01); *G01D 5/145* (2013.01); *G05B 6/02* (2013.01)

(58) Field of Classification Search
None
See application file for complete search history.

(56) References Cited

U.S. PATENT DOCUMENTS

| | | | |
|---|---|---|---|
| 6,550,351 B1 | 4/2003 | O'Reilly et al. | |
| 6,689,972 B1 | 2/2004 | Frolov et al. | |
| 6,972,558 B1 | 12/2005 | Robinson | |
| 7,385,645 B2 * | 6/2008 | Boon | G03B 17/08 348/373 |
| 7,497,272 B2 | 3/2009 | Strasser et al. | |
| 7,557,549 B2 | 7/2009 | Underhill | |
| 7,584,937 B2 | 9/2009 | Oishi | |
| 7,586,279 B2 | 9/2009 | Theunissen et al. | |
| 7,900,622 B2 | 3/2011 | Douglas et al. | |
| 8,358,279 B2 | 1/2013 | Han et al. | |
| 8,573,994 B2 | 11/2013 | Kiko et al. | |
| 8,610,012 B2 | 12/2013 | Liebetruth | |
| 9,183,976 B2 | 11/2015 | Hanchett et al. | |
| 9,387,493 B2 | 7/2016 | Lev | |
| 9,529,378 B2 | 12/2016 | Jeon | |
| 2005/0190029 A1* | 9/2005 | Dietrich | D06F 39/005 335/205 |
| 2014/0100687 A1 | 4/2014 | Ekstrom et al. | |
| 2015/0260425 A1 | 9/2015 | Romanowich et al. | |
| 2016/0061480 A1 | 3/2016 | Alexander | |

(Continued)

*Primary Examiner* — Paul B Yanchus, III
(74) *Attorney, Agent, or Firm* — Foley & Lardner LLP

(57) ABSTRACT

An actuator in a HVAC system includes a housing having an interior-facing surface and an exterior-facing surface. The actuator includes magnetic field sensor(s) located within the housing and arranged adjacent to the interior-facing surface. The actuator includes a user input device retaining magnet(s) that are movable into multiple different positions along the exterior-facing surface of the housing. An actuator controller includes a magnet locator that determines a location of the magnet(s) with respect to the magnetic field sensor(s) based on data generated by the magnetic field sensor(s). The actuator controller also includes a settings generator that generates settings for the actuator based on the location of the magnet(s) determined via the magnet locator.

19 Claims, 9 Drawing Sheets

(56) References Cited

U.S. PATENT DOCUMENTS

2016/0348880 A1    12/2016   Galli et al.
2017/0298655 A1    10/2017   Sims et al.
2018/0224306 A1*    8/2018   Wimmer ................. F24C 7/082

* cited by examiner

HVAC ACTUATOR WITH CONTACTLESS ADJUSTABLE SETTINGS

BACKGROUND

The present disclosure relates generally to actuators in a heating, ventilating, or air conditioning (HVAC) system and more particularly to adjustment of settings for HVAC actuators.

HVAC actuators are used to operate a wide variety of HVAC components such as air dampers, fluid valves, air handling units, and other components that are typically used in HVAC systems. For example, an actuator may be coupled to a damper in a HVAC system and may be used to drive the damper between an open position and a closed position. A HVAC actuator typically includes a motor and a drive device (e.g., a hub, a drive train, etc.) that is driven by the motor and coupled to the HVAC component.

Some HVAC actuators may be reconfigurable in some way. For instance, some actuators may have settings that can be changed by a user. Typically, a user is required to remove the actuator from its current location within the HVAC system, adjust settings to the actuator, and re-install the actuator. This process can become burdensome. Further, typical actuators may be difficult to seal, as these actuators include switches (e.g., dip switches, mode selection switches or dials, etc.) that cannot be completely sealed. Accordingly, typical actuators may become exposed to elements which may cause electromechanical issues as a result.

SUMMARY

One implementation of the present disclosure is an actuator in a HVAC system. The actuator includes a housing comprising an interior-facing surface and an exterior-facing surface. The actuator includes one or more magnetic field sensors located within the housing and arranged adjacent to the interior-facing surface of the housing. The actuator includes a user input device retaining one or more magnets that are movable into multiple different positions along the exterior-facing surface of the housing. The actuator includes an actuator controller. The actuator controller includes a magnet locator that determines a location of the one or more magnets with respect to the one or more magnetic field sensors based on data generated by the magnetic field sensors. The actuator controller includes a settings generator that generates one or more settings for the actuator based on the location of the one or more magnets determined via the magnet locator.

In some embodiments, the magnetic field sensors may be at least one of a hall effect sensor or a reed switch.

In some embodiments, the user input device includes a post extending through the housing substantially perpendicular to the interior-facing surface and the exterior-facing surface. The post may be rotatable about an axis extending through the post. The user input device may also include an arm adjacent to an end of the post. The arm may be rotatable about the axis.

In some arrangements, the arm may include a tab selectively engageable with one detent of a plurality of detents formed into the exterior-facing surface of the side of the actuator. The one detent may correspond to the setting generated via the settings generator.

In some arrangements, the arm may include a retaining portion that retains a magnet of the one or more magnets. The magnet may be rotatable about the axis by way of rotation of the arm.

In some arrangements, the magnetic field sensors may be radially arranged at a distance from the axis corresponding to a distance between the magnet and the axis.

In some arrangements, the end of the post further includes a notch usable to rotate the user input device about the axis.

In some arrangements, the end of the post may be a first end. The post may further include a second end opposite the first end, and the second end may include a notch usable to rotate the user input device about the axis.

In some arrangements, the end of the post further includes an indicator that indicates which setting is being selected through rotation of the user input device about the axis.

In some embodiments, the user input device includes a carrier including a plurality of slots, each slot retaining a respective magnet of the one or more magnets.

In some arrangements, the carrier is releasably retainable in a slot formed into the exterior-facing surface of the housing.

In some arrangements, the one or more magnetic field sensors may be linearly arranged along at least a portion of the slot formed into the exterior-facing surface of the housing. Each of the one or more magnetic field sensors may correspond to a respective magnet of the one or more magnets.

Another implementation of the present disclosure is a method of modifying a setting for an actuator of a HVAC system. The method includes determining a location of a magnet of a user input device with respect to a magnetic field sensor based on data generated by the magnetic field sensor, the magnet being positioned adjacent to an exterior-facing surface of a housing of the actuator, and the magnetic field sensor being positioned within the housing and arranged adjacent to an interior-facing surface of the housing. The method includes determining an input from a user for modifying a setting of the actuator, the input being determined based on the determined location of the magnet. The method includes modifying the setting of the actuator according to the determined input from the user.

In some embodiments, the setting is at least one of an address setting, a direct acting option, a reverse acting option, a zero-to-ten direct current voltage control, a two-to-ten direct current voltage control, a mode for an auto-calibration cycle of the actuator.

In some embodiments, such as those where the setting is the address setting for the actuator, the magnet may be one of a number of magnets and the magnetic field sensor may be one of a number of magnetic field sensors, each magnet of the number of magnets corresponding to a respective magnetic field sensor of the number of magnetic field sensors.

In some embodiments, the input from the user may be an address to set as the address setting for the actuator, and the address is determined based data generated by each of the number of magnetic field sensors corresponding to the presence of the respective magnet.

In some embodiments, the magnetic field sensor is one of a number of magnetic field sensors radially arranged about an axis.

In some embodiments, determining the location of the magnet may include determining the location of the magnet by determining which of the number of magnetic field sensors generates data corresponding to a presence of the magnet.

In some embodiments, the actuator has a number of settings including the setting.

In some embodiments, the number of magnetic field sensors may corresponds to the number of settings for the actuator.

In some embodiments, the number of magnetic field sensors may be less than the number of settings for the actuator.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, a HVAC actuator is shown, according to an exemplary embodiment. The actuator may be a damper actuator, a valve actuator, a fan actuator, a pump actuator, or any other type of actuator that can be used in a HVAC system.

The actuator includes a motor and a drive device driven by the motor. In some embodiments, the motor is a brushless direct current (BLDC) motor. The drive device is coupled to a movable HVAC component for driving the movable HVAC component between multiple positions. The actuator may include an actuator controller. The actuator controller may generate setting(s) for the actuator. For instance, the actuator controller may generate an address setting for the actuator. Additionally or alternatively, the actuator controller may generate auto-calibration settings, direct/reverse action settings, and/or voltage control settings.

The actuator is configured to have settings that are adjustable by a user. For instance, the actuator may include a user input device. The user input device may include magnet(s) that are movable into multiple different positions. A user may provide settings for the actuator via the user input device by moving the magnet(s). The actuator controller may identify the location of the magnet(s), and may generate settings for the actuator based on the location of the magnet(s).

Unlike conventional techniques, the aspects described herein reduce the risk of environmental-related damage to the actuator. For instance, as a result of the aspects described herein, the actuator may be fully sealed, thus inhibiting environmental elements from entering the housing of the actuator. The aspects described herein may permit a user to easily adjust settings for the actuator. A user may provide settings to the actuator by, for example, rotating one of the user input device(s) from one of the ends that are exposed. In rotating the user input device, the actuator may have one or more settings adjusted. Additionally, a user may provide settings for the actuator by, for example, removing one of the user input device(s) from a slot in the housing, moving magnets retained in the user input device to adjust the settings, and sliding the user input device into the slot of the housing. As a result, the user may adjust settings for the actuator without having to uninstall the actuator, adjust the settings, and reinstall the actuator. Various other benefits of the present disclosure will become apparent as follows.

Building Management System and HVAC System

Figure 1:
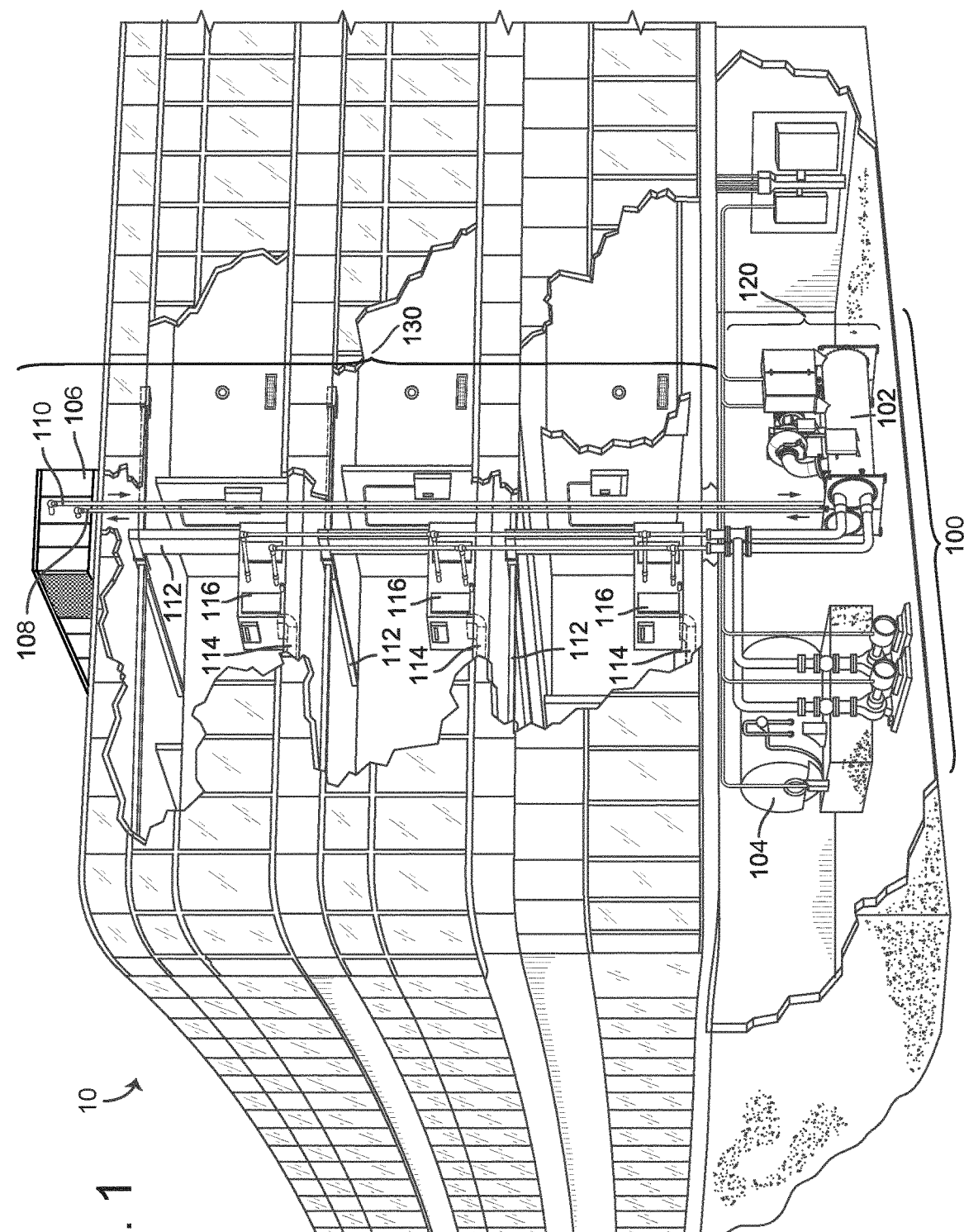
FIG. 1 is a drawing of a building equipped with a heating, ventilating, or air conditioning (HVAC) system and a building management system (BMS), according to an exemplary embodiment.

Referring now to FIGS. 1-4, an exemplary building management system (BMS) and HVAC system in which the systems and methods of the present invention may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS may include, for example, a HVAC system, a security system, a lighting system, a fire alerting system, any other system that is capable of managing building functions or devices, or any combination thereof.

The BMS that serves building 10 includes a HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid.

The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that may be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
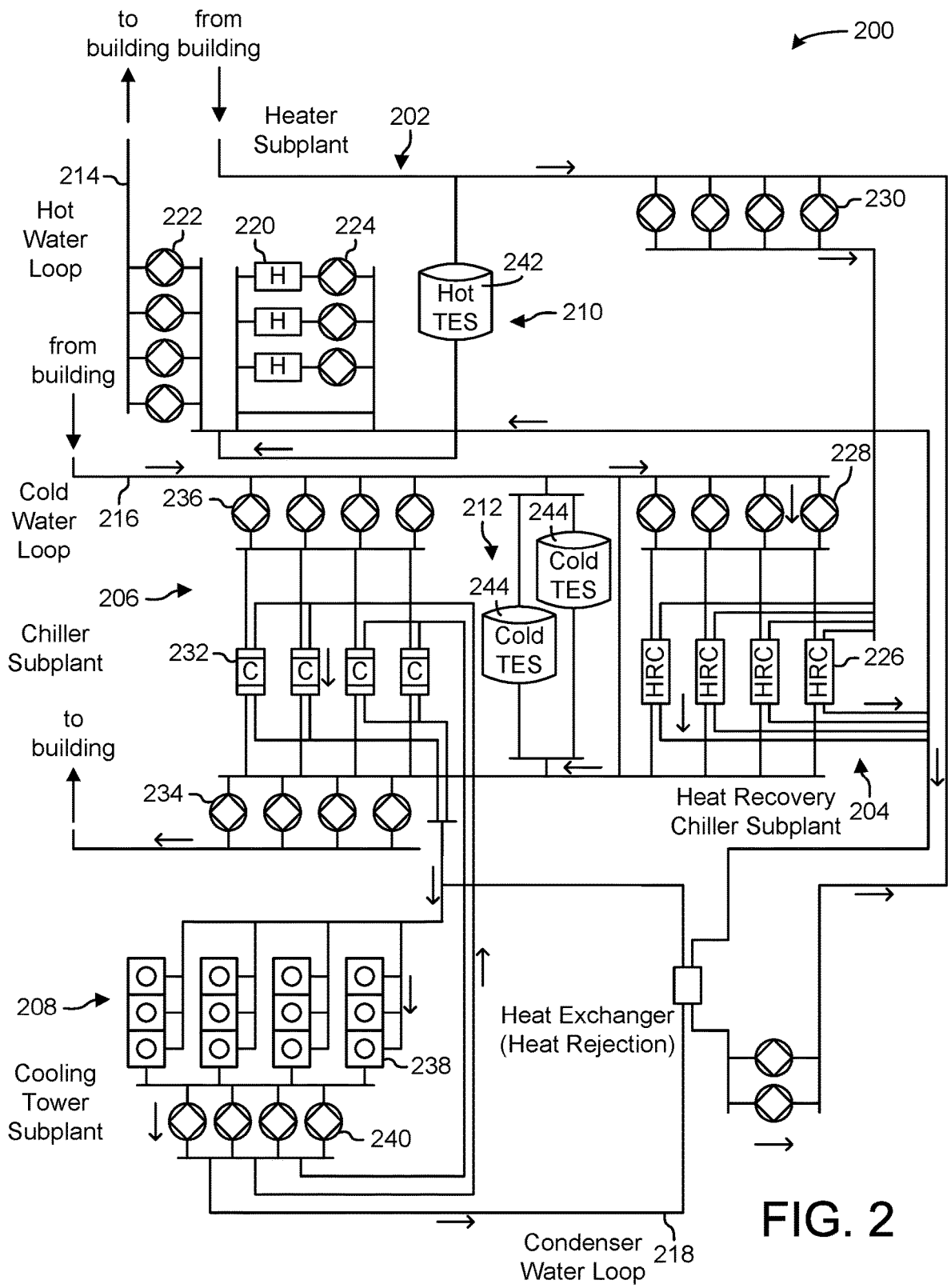
FIG. 2 is a schematic diagram of a waterside system which may be used to support the HVAC system of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
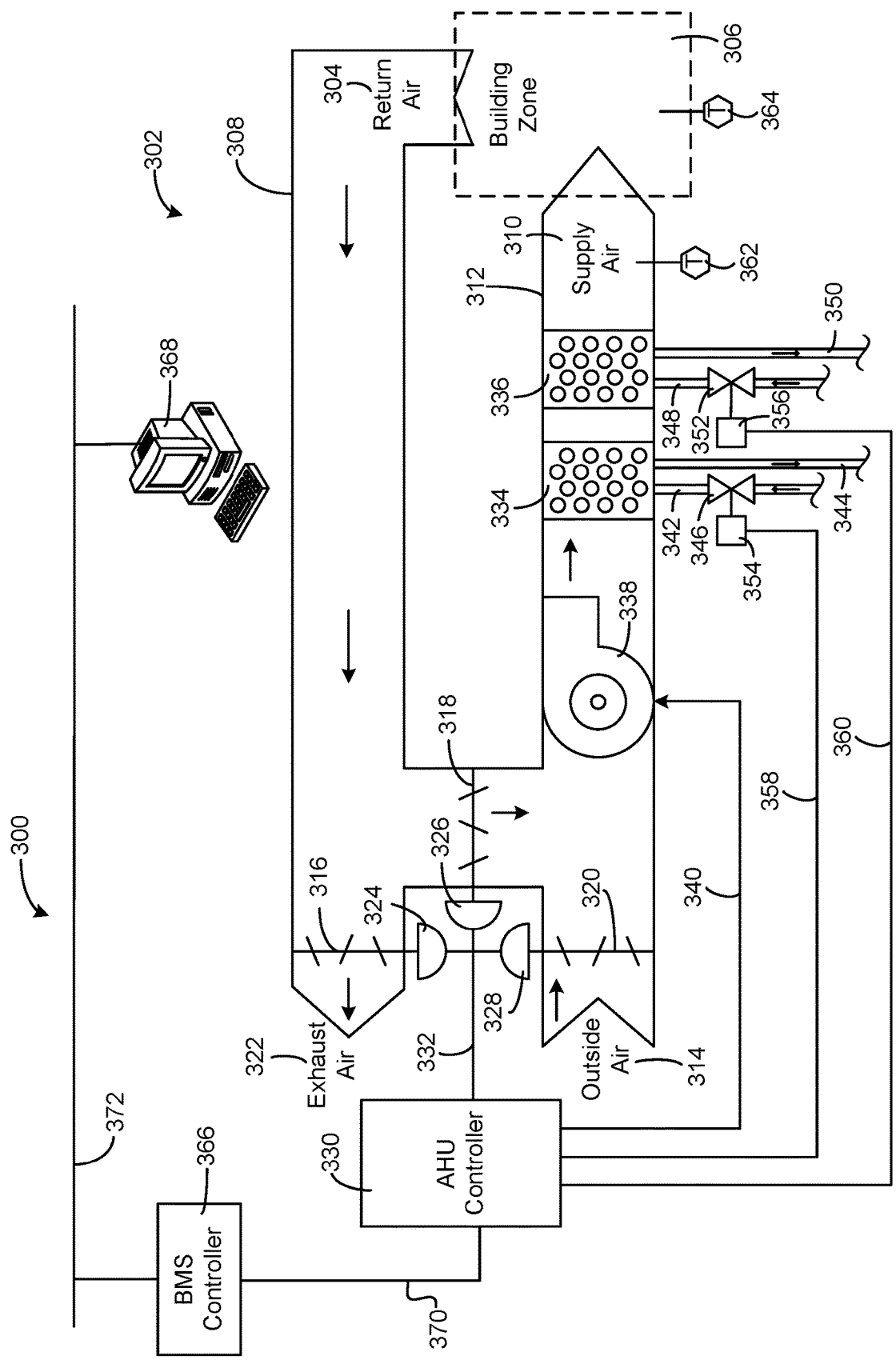
FIG. 3 is a block diagram of an airside system which may be used as part of the HVAC system of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that may be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that may be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that may be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
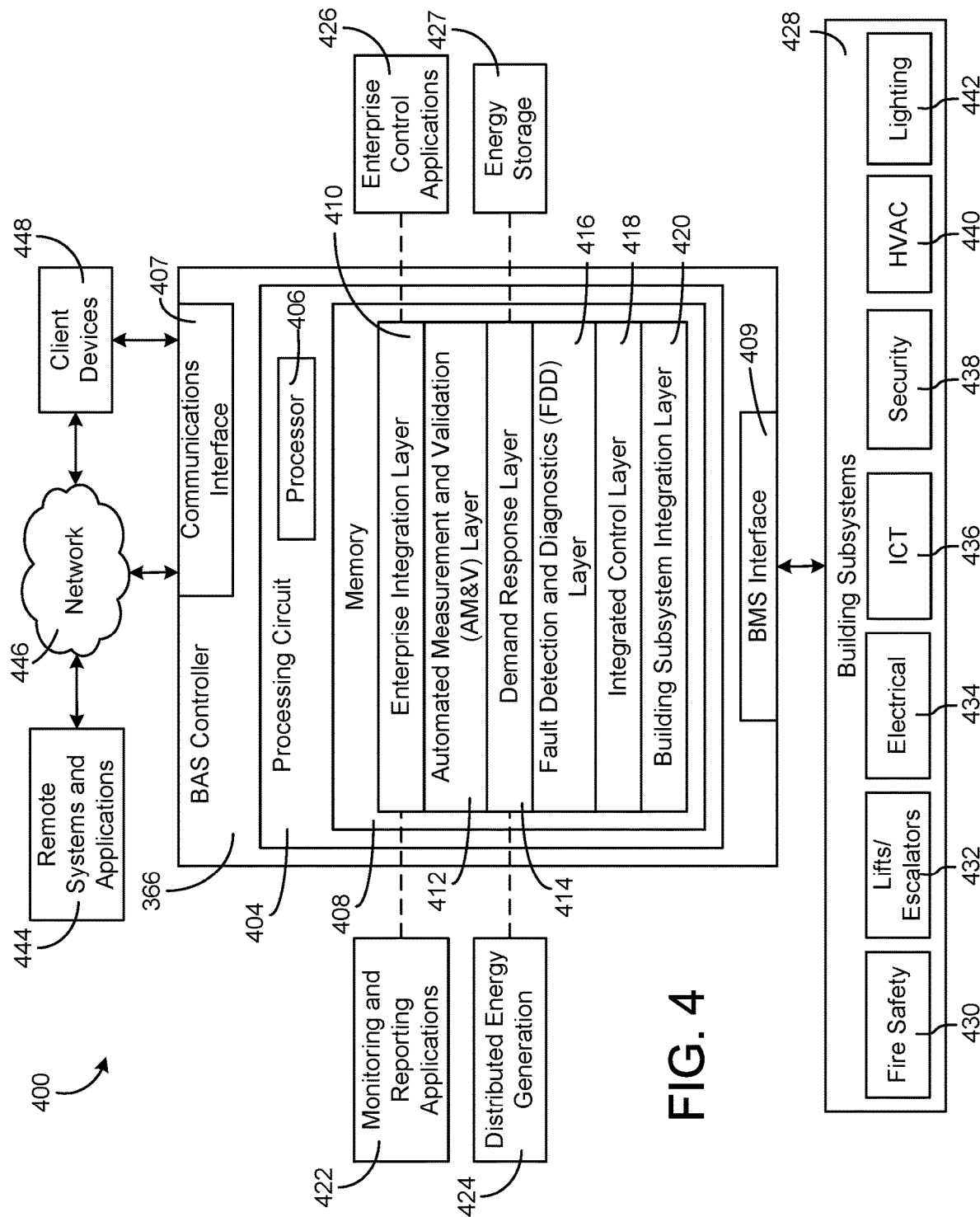
FIG. 4 is a block diagram of a BMS which may be implemented in the building of FIG. 1, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 may include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include and number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 may be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 may include an Ethernet card and port for sending and receiving data via an Ethernet-based communications link or network. In another example, interfaces 407, 409 may include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof may send and receive data via interfaces 407, 409. Processor 406 may be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that may exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 may work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses may include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions may specify which equipment may be turned on or off in response to particular demand inputs, how long a system or piece of equipment should be turned off, what setpoints may be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 may integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions may be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes may be examined by FDD layer 416 to expose when the system begins to degrade in performance and alert a user to repair the fault before it becomes more severe.

HVAC Actuator

Figure 5:
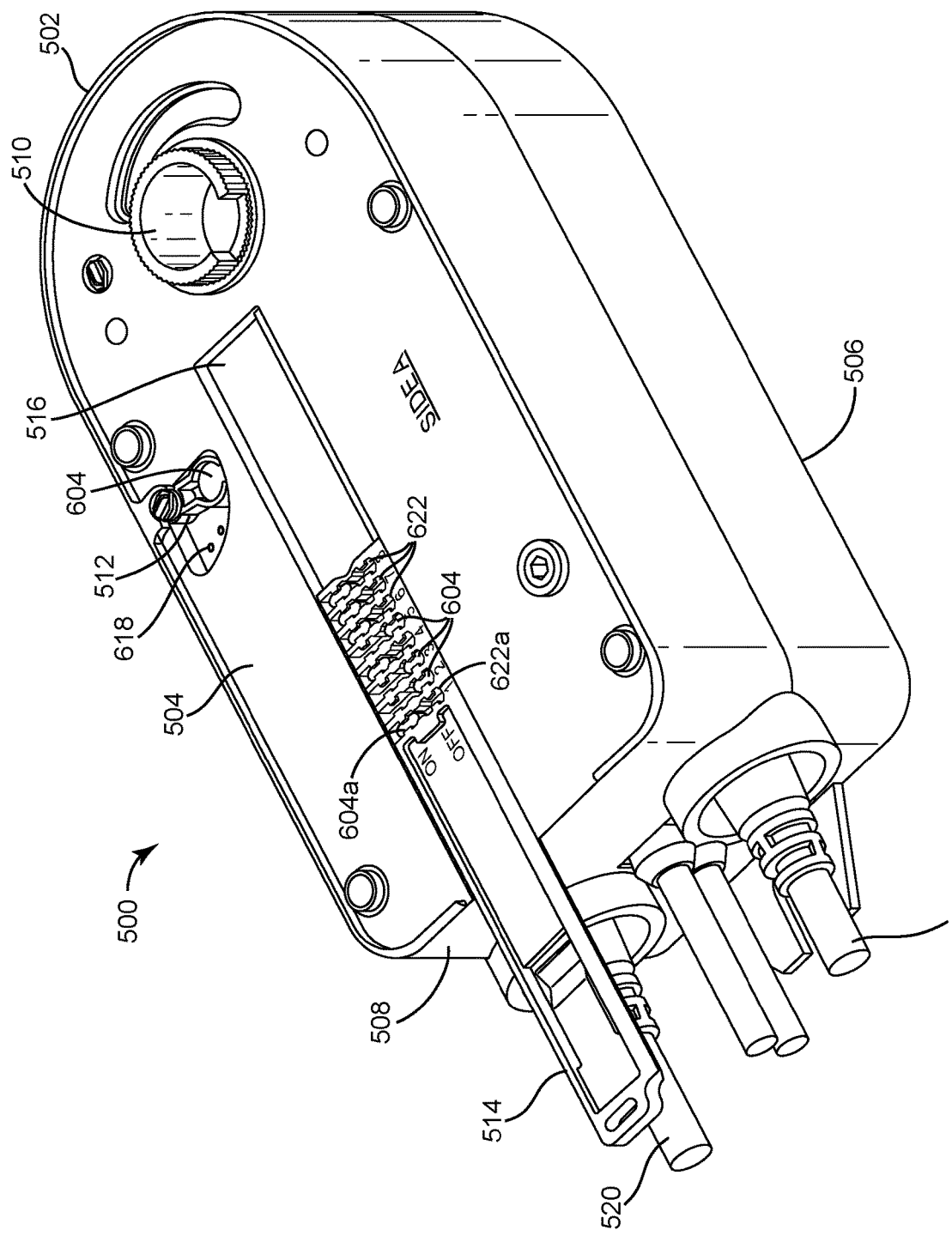
FIG. 5 is a view of an actuator which may be used in the HVAC system of FIG. 1, the waterside system of FIG. 2, the airside system of FIG. 3, or the BMS of FIG. 4 to control a HVAC component, according to an exemplary embodiment.

Referring now to FIG. 5, an actuator 500 for use in a HVAC system is shown, according to an exemplary embodiment. In some implementations, actuator 500 may be used in HVAC system 100, waterside system 200, airside system 300, or BMS 400, as described with reference to FIGS. 1-4. For example, actuator 500 may be a damper actuator, a valve actuator, a fan actuator, a pump actuator, or any other type of actuator that may be used in a HVAC system or BMS. In various embodiments, actuator 500 may be a linear actuator (e.g., a linear proportional actuator), a non-linear actuator, a spring return actuator, or a non-spring return actuator.

Actuator 500 is shown to include a housing 502 having a first side 504 (i.e., side A), a second side 506 (i.e., side B) opposite first side 504, and a bottom 508. Housing 502 may contain the mechanical and processing components of actuator 500. In some embodiments, housing 502 contains a brushless direct current (BLDC) motor and a processing circuit configured to provide a pulse width modulated (PWM) DC output to control the speed of the BLDC motor.

Actuator 500 is shown to include a drive device 510. Drive device 510 may be a drive mechanism, a hub, or other device configured to drive or effectuate movement of a HVAC system 100 component. For example, drive device 510 may be configured to receive a shaft of a damper, a valve, or any other movable HVAC system 100 component in order to drive (e.g., rotate) the shaft. In some embodiments, actuator 500 includes a coupling device configured to aid in coupling drive device 510 to movable HVAC system 100 component. For example, coupling device may facilitate attaching drive device 510 to a valve or damper shaft.

Actuator 500 is shown to include an input connection 520 and an output connection 522. In some embodiments, input connection 520 and output connection 522 are located along bottom 508. In other embodiments, input connection 520 and output connection 522 may be located along one or more other surfaces of housing 502. Input connection 520 may be configured to receive a control signal (e.g., a voltage input signal) from an external system or device. Actuator 500 may use the control signal to determine an appropriate PWM DC output for the BLDC motor. In some embodiments, the control signal is received from a controller such as an AHU controller (e.g., AHU controller 330), an economizer controller, a supervisory controller (e.g., BMS controller 366), a zone controller, a field controller, an enterprise level controller, a motor controller, an equipment-level controller (e.g., an actuator controller) or any other type of controller that may be used in a HVAC system 100 or BMS.

In some embodiments, the control signal is a DC voltage signal. Actuator 500 may be a linear proportional actuator configured to control the position of drive device 510 according to the value of the DC voltage received at input connection 520. For example, a minimum input voltage (e.g., 0.0 VDC, 2.0 VDC) may correspond to a minimum rotational position of drive device 510 (e.g., 0 degrees, −5 degrees, etc.), whereas a maximum input voltage (e.g., 10.0 VDC) may correspond to a maximum rotational position of drive device 510 (e.g., 90 degrees, 95 degrees, etc.). Input voltages between the minimum and maximum input voltages may cause actuator 500 to move drive device 510 into an intermediate position between the minimum rotational position and the maximum rotational position. In other embodiments, actuator 500 may be a non-linear actuator or may use different input voltage ranges or a different type of input signal (e.g., AC voltage or current) to control the position and/or rotational speed of drive device 510.

In some embodiments, the control signal is an AC voltage signal. Input connection 520 may be configured to receive an AC voltage signal having a standard power line voltage (e.g., 120 VAC or 230 VAC at 50/60 Hz). The frequency of the voltage signal may be modulated (e.g., by a controller for actuator 500) to adjust the rotational position and/or speed of drive device 510. In some embodiments, actuator 500 uses the voltage signal to power various components of actuator 500. Actuator 500 may use the AC voltage signal received via input connection 520 as a control signal, a source of electric power, or both. In some embodiments, the voltage signal is received at input connection 520 from a power supply line that provides actuator 500 with an AC voltage having a constant or substantially constant frequency (e.g., 120 VAC or 230 VAC at 50 Hz or 60 Hz). Input connection 520 may include one or more data connections (separate from the power supply line) through which actuator 500 receives control signals from a controller or another actuator (e.g., 0-10 VDC control signals).

In some embodiments, actuator 500 may be configured to switch between AC voltage control and DC voltage control. As will be discussed in greater detail below, actuator 500 may include a user input device 510, 512 for switching between AC voltage control and DC voltage control. Further, in some examples, actuator 500 may be configured to switch between different minimum input voltages. For instance, actuator 500 may be configured to switch between a 0.0 VDC minimum input voltage and a 2.0 VDC minimum input voltage.

In some embodiments, the control signal is received at input connection 520 from another actuator. For example, if multiple actuators are interconnected in a tandem arrangement, input connection 520 may be connected (e.g., via a communications bus) to the output data connection of another actuator. One of the actuators may be arranged as a master actuator with its input connection 520 connected to a controller, whereas the other actuators may be arranged as slave actuators with their respective input connections connected to output connection 522 of the master actuator.

Output connection 522 may be configured to provide a feedback signal to a controller of HVAC system 100 or BMS in which actuator 500 is implemented (e.g., an AHU controller, an economizer controller, a supervisory controller, a zone controller, a field controller, an enterprise level controller, etc.). The feedback signal may indicate the rotational position and/or speed of actuator 500. In some embodiments, output connection 522 may be configured to provide a control signal to another actuator (e.g., a slave actuator) arranged in tandem with actuator 500. Input connection 520 and output connection 522 may be connected to the controller or the other actuator via a communications bus. The communications bus may be a wired or wireless communications link and may use any of a variety of disparate communications protocols (e.g., BACnet, LON, WiFi, Bluetooth, NFC, TCP/IP, etc.).

Figure 6:
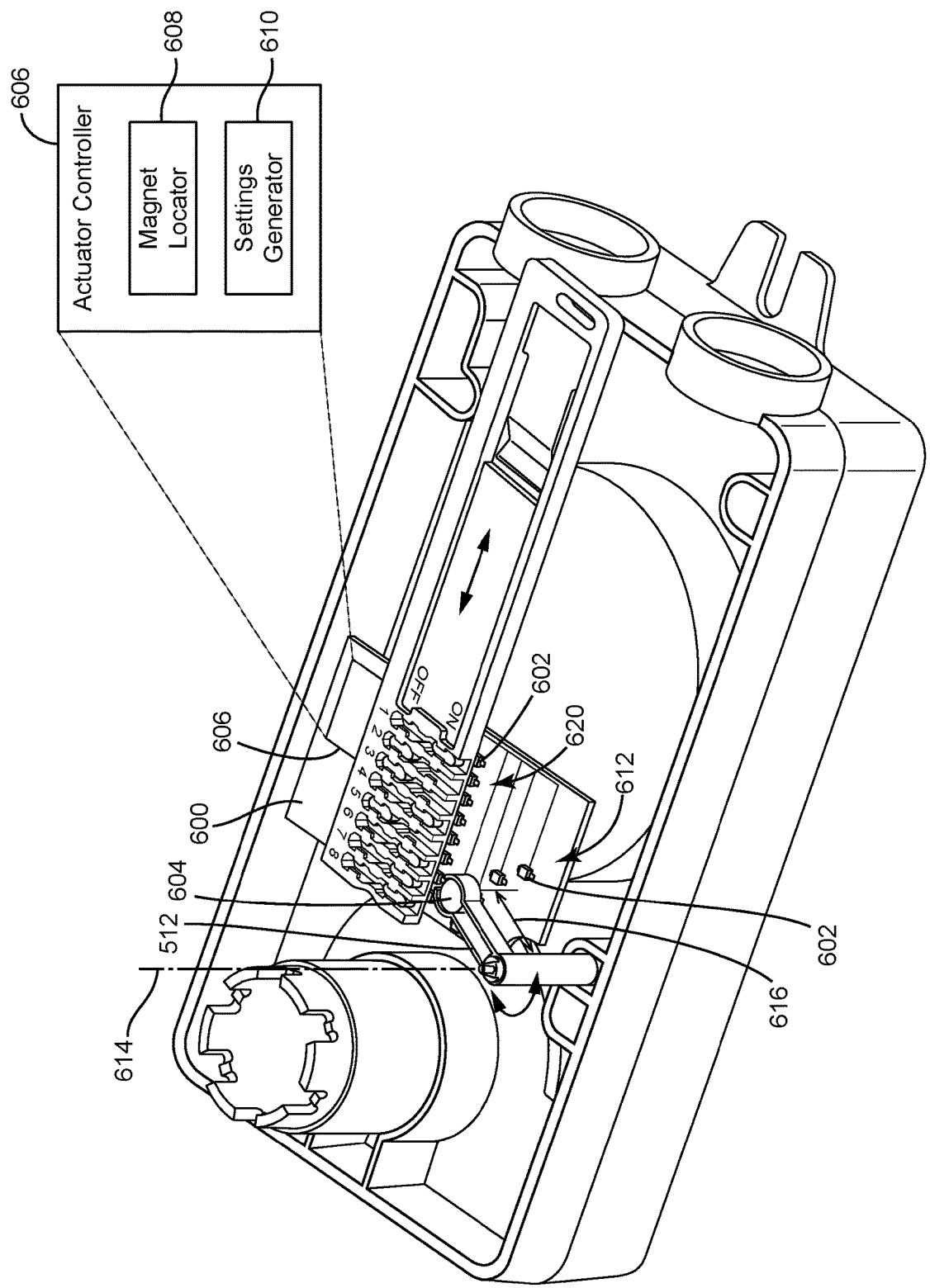
FIG. 6 is another view of the actuator of FIG. 5 including internal circuitry, according to an exemplary embodiment.
Figure 7:
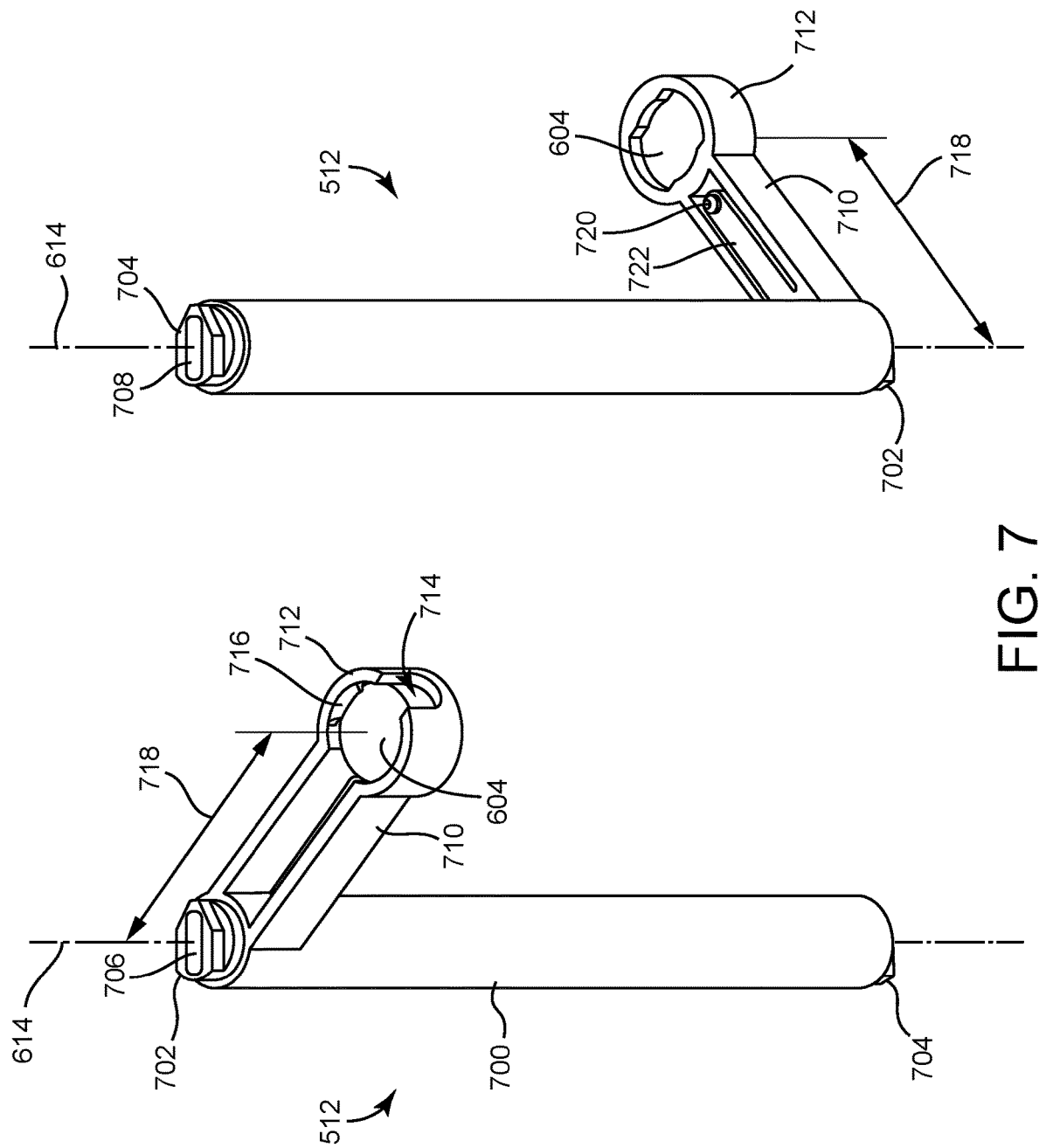
FIG. 7 is a view of a user input device for the actuator of FIG. 5, according to an exemplary embodiment.

Still referring to FIG. 5-7, actuator 500 is shown to include a first user input device 512 located along first side 504 and a second user input device 514 also located along first side 504. In some implementations, the first user input device 512 and second user input device 514 may be positioned along different sides (e.g., both may be located along second side 506, one may be located along first side 504 and another located along second side 506, etc.). User input devices 512-514 may be used to set actuator 500 to a particular operating mode or to configure actuator 500 to accept a particular type of input.

In some embodiments, user input device 512 may be a mode selection dial having a distinct number of modes or positions. User input device 512 may be provided for embodiments in which actuator 500 is a linear proportional actuator that controls the position of drive device 510 as a function of a DC input voltage received at input connection 520. In some embodiments, the function of user input device 512 is the same or similar to the function of the mode selection switch described in U.S. patent application Ser. No. 14/727,284, filed Jun. 1, 2015, the entire disclosure of which is incorporated by reference herein. For example, the position of the user input device 512 may be adjusted to set actuator 500 to operate in a direct acting mode, a reverse acting mode, or a calibration mode.

User input device 512 is shown to include a 0-10 direct acting (DA) mode, a 2-10 DA mode, a calibration (CAL) mode, a 2-10 reverse acting (RA) mode, and a 0-10 RA mode. According to other exemplary embodiments, user input device 512 may have a greater or smaller number of modes and/or may have modes other than listed as above. The position of user input device 512 may define the range of DC input voltages that correspond to the rotational range of drive device 510. For example, when user input device 512 is set to 0-10 DA, an input voltage of 0.0 VDC may correspond to 0 degrees of rotation position for drive device 510. For this same mode, an input voltage of 1.7 VDC may correspond to 15 degrees of rotation position, 3.3 VDC may correspond to 30 degrees of rotation position, 5.0 VDC may correspond to 45 degrees of rotation position, 6.7 VDC may correspond to 60 degrees of rotation position, 8.3 VDC may correspond to 75 degrees of rotation position, and 10.0 VDC may correspond to 90 degrees of rotation position. With input device 512 in the "Auto-Cal" position, actuator 500 may be configured automatically determine the input voltage received at input connection 520 and may adjust the voltage reduction factor accordingly. It should be understood that these voltages and corresponding rotational positions are merely exemplary and may be different in various implementations.

Additionally or alternatively, user input device 512 may also be provided for embodiments in which actuator 500 is configured to accept an AC voltage at input connection 520. In some embodiments, the function of user input device 512 is the same or similar to the function of the mode selection switch described in U.S. patent application Ser. No. 14/475,141, filed Sep. 1, 2014, the entire disclosure of which is incorporated by reference herein. For example, the position of user input device 512 may be adjusted to set actuator 500 to accept various different AC voltages at input connection 520.

While not shown in FIG. 5, user input device 512 may include a "24 VAC" position, a "120 VAC" position, a "230 VAC" position, an "Auto" position. Each position of user input device 512 may correspond to a different operating mode. According to other exemplary embodiments, user input device 512 may have a greater or lesser number of positions and/or may have modes other than the modes explicitly listed. The different operating modes indicated by user input device 512 may correspond to different voltage reduction factors applied to the input voltage received at input connection 520. For example, with user input device 512 in the 24 VAC position, actuator 500 may be configured to accept an input voltage of approximately 24 VAC (e.g., 20-30 VAC) at input connection 520 and may apply a reduction factor of approximately 1 to the input voltage. With user input device 512 in the 120 VAC position, actuator 500 may be configured to accept an input voltage of approximately 120 VAC (e.g., 100-140 VAC, 110-130 VAC, etc.) at input connection 520 and may apply a reduction factor of approximately 5 (e.g., 3-7, 4-6, 4.5-5.5, etc.) to the input voltage. With user input device 512 in the 230 VAC position, actuator 500 may be configured to accept an input voltage of approximately 230 VAC (e.g., 200-260 VAC, 220-240 VAC, etc.) at input connection 520 and may apply a reduction factor of approximately 9.6 (e.g., 7-13, 8-12, 9-10, etc.) to the input voltage. With user input device 512 in the "Auto" position, actuator 500 may be configured automatically determine the input voltage received at input connection 520 and may adjust the voltage reduction factor accordingly.

In some embodiments, user input device 514 may be an address setting carrier. The address setting carrier may be used to set an address for actuator 500. Accordingly, user input device 514 may be used as an alternative to physical switches (e.g., dip switches) located on actuator 500. The address may be used to transmit specific control signals to actuator 500. For instance, actuator 500 may receive an input signal from, for example, AHU controller 330 (of FIG. 3) at input connection 520. The input signal may include the address indicating that actuator 500 is the target for the input signal. In some examples, HVAC system 100 may include a plurality of actuators including actuator 500. Each of the actuators, including actuator 500, may be arranged in series, in parallel, etc. Each actuator may have an associated address, which may be set by a user via user input device 514. The respective address for each actuator may be provided to AHU controller 330. AHU controller 330 may transmit input signals, along with an address for a particular actuator (e.g., actuator 500, for example) via communications links 358-360 (of FIG. 3). Actuator 500 may receive the input signal and the address via input connection 520. Actuator 500 may then be controlled according to the input signal when the address received via input connection 520 matches the address associated with actuator 500.

As shown, first side 504 may include a slot 516 sized to receive user input device 514. User input device 514 can be removed and/or retained into slot 516 by a user. Accordingly, the user can remove user input device 514, provide one or more adjustments of user input device 514, and slide user input device 514 back into slot 516. In one or more implementations, user input device 514 may include a locking mechanism (not shown) which secures user input device 514 into slot 516. For instance, the locking mechanism may include spring-loaded tabs that engage with corresponding notches in sides or the bottom of user input device 514. In this example, the user may push user input device 514 into slot 516 to cause the spring-loaded tabs to engage the corresponding notches and thereby properly position user input device 514. To remove user input device 514, the user may push in user input device 514 to cause the spring-loaded tabs to disengage and cause user input device 514 to come out from slot 516. The user may then slide user input device 514 from slot 516. While this example is provided, many other components/devices may be used to position user input device 514 in the proper location.

Referring specifically to FIG. 6, actuator 500 is shown in greater detail. Actuator 500 is shown to include a control circuit, shown as circuit board 600. Circuit board 600 may include various circuits (not shown) which are used to control actuator 500. As shown in detail in FIG. 7, circuit board 600 may be positioned adjacent to first side 504 of housing 502. For instance, circuit board 600 may be positioned within housing 502 and adjacent to an interior-facing surface of the first side 504 of housing 502 (e.g., a surface of the first side 504 facing the interior portion of housing 502). While shown as being positioned adjacent to first side 504 of housing 502, in some implementations, circuit board 600 may be positioned adjacent to second side 506.

In some embodiments, circuit board 600 includes one or more magnetic field sensors 602. Magnetic field sensors 602 may be or include any sensor or device configured to detect a presence of a magnet 604. In some implementations, magnetic field sensors 602 may be hall effect sensors or reed switches. Magnetic field sensors 602 may be arranged to detect a presence of magnets 604 retained in user input device(s) 512-514. Accordingly, at least a portion of circuit board 600 (e.g., the portion including magnetic field sensors 602) may be located along an opposite surface of the same side of actuator 500 where user input device(s) 512-514 are located.

In one or more embodiments, actuator 500 may be controlled by an actuator controller 606. In some implementations, such as those shown in FIG. 6, actuator controller 606 may be implemented on circuit board 600 of actuator 500. In other implementations, actuator controller 606 may be located external from actuator 500. For instance, actuator controller 606 may be a component of BMS controller 366. In these and other implementations, actuator controller 606 may be implemented as a processing circuit (e.g., processing circuit 404) having a processor and memory (e.g., processor 406 and memory 408). The processor may be implemented as a general purpose processor, an application specific integrated circuit (ASIC), one or more field programmable gate arrays (FPGAs), a group of processing components, or other suitable electronic processing components. Additionally, memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory may include database components, object code components, script components, or any other type of information structure for supporting the various activities and information structures described in the present application. According to an exemplary embodiment, memory is communicably connected to processor via processing circuit and includes computer code for executing (e.g., by processing circuit and/or processor) one or more processes described herein.

In one or more embodiments, actuator controller 606 may include a magnet locator 608. Magnet locator 608 may be used by actuator controller 606 to determine a location of magnet(s) 604 of user input device(s) 512, 514 with respect to magnetic field sensor(s) 602, as will be discussed in further detail below. Magnet locator 608 may be operatively connected to each magnetic field sensor 602. Actuator controller 606 may receive the signals from each magnetic field sensor 602. Actuator controller 606 may determine the location of a magnet based on the signals received from each magnetic field sensor 602. For instance, when a magnet (e.g., magnet 604) of a user input device 512, 514 is in the presence of magnetic field sensor 602, magnetic field sensor 602 may generate a signal indicating the presence of the magnet. Alternatively, when a magnet is not in the presence of a magnetic field sensor 602, each magnetic field sensor 602 may generate a signal indicating the absence of the magnet. Accordingly, a location of magnets (e.g., magnet 604) may be determined based on the presence/absence as indicated by the signal.

In one or more embodiments, actuator controller 606 may include a settings generator 610. Settings generator 610 may be used by actuator controller 606 to generate one or more settings for actuator 500 based on the location of the magnets 604 (as determined via magnet locator 608). As stated above, the settings can be or include a 0-10 direct acting (DA) mode, a 2-10 DA mode, a calibration (CAL) mode, a 2-10 reverse acting (RA) mode, and a 0-10 RA mode, a "24 VAC" position, a "120 VAC" position, a "230 VAC" position, an "Auto" position, an address setting, to name several possibilities. Each of these settings can be associated with particular locations of magnet(s) 604 of user input device 512, 514. In one or more embodiments, actuator controller 606 may determine a user input based on the location of particular magnets 604. For instance, actuator controller 606 can determine, via settings generator 610, particular user inputs associated with particular settings. As one example, the user input may be rotating magnet 604 of user input device 512 into a different position (e.g., to select a different setting). As another example, the user input may be sliding multiple magnets 604 within user input device 514 (e.g., to select an address setting). Actuator controller 606 may identify the user inputs associated with these movements of magnet(s) 604. Actuator controller 606 may generate settings via settings generator 610 for actuator 500 based on the location of magnet(s) 604 as determined via magnet locator 608.

In examples where the setting is one of a 0-10 direct acting (DA) mode, a 2-10 DA mode, a calibration (CAL) mode, a 2-10 reverse acting (RA) mode, and a 0-10 RA mode, a "24 VAC" position, a "120 VAC" position, a "230 VAC" position, an "Auto" position, when user input device 512 is rotated to the particular position associated with the particular setting, magnet 604 of user input device 512 will be located in a position corresponding to the particular setting. Accordingly, the user input may be a user moving user input device 512 to a desired location associated with a particular desired setting. actuator controller 606 may determine the location of magnet 604 using magnet locator 608. Additionally, actuator controller 606 may determine the setting associated with the location of magnet 604 using settings generator 610. Actuator controller 606 may then generate those settings for actuator 500 using settings generator 610.

In examples where the setting is an address setting, when magnets 604 retained in user input device 512, 514 are switched to different positions, magnets 604 may generate a binary number based on their presence/absence above associated magnetic field sensors 602. Accordingly, the user input may be a binary number associated with an address for actuator 500. Actuator controller 606 may determine the presence/absence of magnets 604 over each corresponding magnetic field sensor 602 via magnet locator 608. Actuator controller 606 may determine the setting associated with the binary number (e.g., the address) using settings generator 610. Actuator controller 606 may generate the setting (e.g., the address) for actuator 500 using settings generator 610.

Referring now to FIG. 6 and FIG. 7, in some embodiments, a first set 612 of magnetic field sensors 602 may be associated with user input device 512. In embodiments such as these, each magnetic field sensor 602 in the first set 612 may be associated with a particular setting. Accordingly, a user may provide a particular setting by adjusting user input device 512 where magnet 604 retained in user input device 512 is located adjacent to a corresponding magnetic field sensor 602 and thereby provide the particular setting. For instance, a user may rotate user input device 512 about axis 614 to move magnet 604 to a different location, and thereby provide a setting corresponding to a position of magnet 604.

user input device 512 may include a post 700. Post 700 may extend through housing 502 of actuator 500. As shown, post 700 may in some implementations extend perpendicular to the first side 504 and second side 506. Post 700 may define an axis 614 extending through housing 502. Post 700 may be configured to rotate about axis 614. In some embodiments, post 700 may have a first end 702 located along the first side 504 of housing 502, and a second end 704 located along the second side 506 of the housing 502. Both the first and second end 702, 704 may be exposed (e.g., visible or accessible from outside actuator 500). In some implementations, the first and second end 702, 704 of post 700 may each include a respective notch 706, 708. Notch 706, 708 may be a cross-shaped notch, a flat notch, etc. Each notch 706, 708 may be engagable by a tool (e.g., a Philips/flathead screw driver, for instance), which may be used to rotate user input device 512 about axis 614. In providing notches 706, 708 on both ends 702, 704 of post 700, at least a portion of user input device 512 may be accessible by a user. For instance, where actuator 500 is mounted with the first side 504 facing a wall or ceiling, a user may be able to rotate user input device 512 via notch 708 of the second end 704. As another example, where actuator 500 is mounted with the second side 506 facing a wall or ceiling, a user may be able to rotate user input device 512 via notch 706 of the first end 702. As still another example, where actuator 500 is mounted with one side 504, 506 inaccessible due to nearby conduits, wires, or other material generally located or installed near actuators in HVAC systems, a user may rotate user input device 512 via notch 708, 706 located on the opposite side 506, 504.

As shown in FIG. 7, user input device 512 may include an arm 710 located adjacent to one of ends 702, 704. For instance, in the embodiment shown in FIG. 7, arm 710 is located at first end 702. However, the present disclosure is not limited to this particular arrangement. To the contrary, arm 710 may be located anywhere along post 700. Arm 710 may extend radially from post 700. As such, when post 700 is rotated about axis 614, arm 710 correspondingly rotates about axis 614.

In some embodiments, arm 710 may include a retaining portion 712. Retaining portion 712 may be used to retain magnet 604. For instance, retaining portion 712 nay include an opening 714 which is sized to receive magnet 604. Additionally, retaining portion 712 may include one or more lips 716 located along a perimeter of retaining portion 712. Lips 716 may extend from the perimeter of retaining portion 712 inwardly towards the center of retaining portion 712. In embodiments such as these, when magnet 604 is inserted into the retaining portion 712, magnet 604 cannot fall out of retaining portion 712.

In one or more implementations, retaining portion 712 (and, accordingly, magnet 604 retained therein) may be located a distance 718 from axis 614. Similarly, the first set 612 of magnetic field sensors 602 may be radially arranged about axis 614 on circuit board 600 a corresponding distance 616 from axis 614. In some instances, distances 718, 616 may be the same. Accordingly, magnet 604 may be selectively located above any of magnetic field sensors 602 in the first set 612.

In some embodiments, arm of 710 of user input device 512 may be located on an opposing surface with respect to magnetic field sensors 602. For instance, arm 710 of user input device 512 may be located adjacent to an exterior-facing surface of the first side 504 of housing 502, and magnetic field sensors 602 may located inside housing 502 adjacent to an interior-facing surface of the first side 504 of housing 502. In embodiments such as these, the interior of housing 502 may be fully sealed, while the actuator 500 may still be reconfigurable/adjustable through adjustment of user input device 512.

Still referring to FIG. 6 and FIG. 7, arm 710 of user input device 512 may further include a tab 720. Additionally, the exterior-facing surface of the first side 504 may include one or more detents 618 formed therein. Detents 618 may be sized to fit at least a portion of tab 720. Detents 618 may be located a distance from axis 614 that is substantially the same as the distance between tab 720 and axis 614. Accordingly, user input device 512 may be rotated the axis 614 until tab 720 is engaged in one of detents 618. In so doing, user input device 512 may be positioned at particular locations when tab 720 is engaged in a particular detent 618. In some implementations, tab 720 may be located on a flexing portion 722 of arm 710. Flexing portion 722 may be configured to flex upwardly as tab 720 is positioned between detents 618, and snap downwardly as tab 70 is positioned into a detent 618, which may make rotation of user input device 512 easier.

Each detent 618 may correspond to a particular magnetic field sensor 602 in the first set 612 of magnetic field sensors 602. For instance, each detent 618 may be aligned with a particular magnetic field sensor 602. Accordingly, when tab 720 is engaged with a specific detent 618, the magnet 604 retained in retaining portion 712 will be positioned above the corresponding magnetic field sensor 602.

In some embodiments, the number of detents 618 may not be the same as the number of magnetic field sensors 602 in the first set 612. For instance, the number of detents 618 may be one less than the number of magnetic field sensors 602. Accordingly, if the presence of magnet 604 is not detected at any of magnetic field sensors 602 in the first set 612, then magnet 604 is positioned in the location where a magnetic field sensor 602 is not present. In embodiments such as these, the cost to produce actuators 500 may be reduced by reducing hardware (e.g., through one less magnetic field sensor 602).

Figure 8:
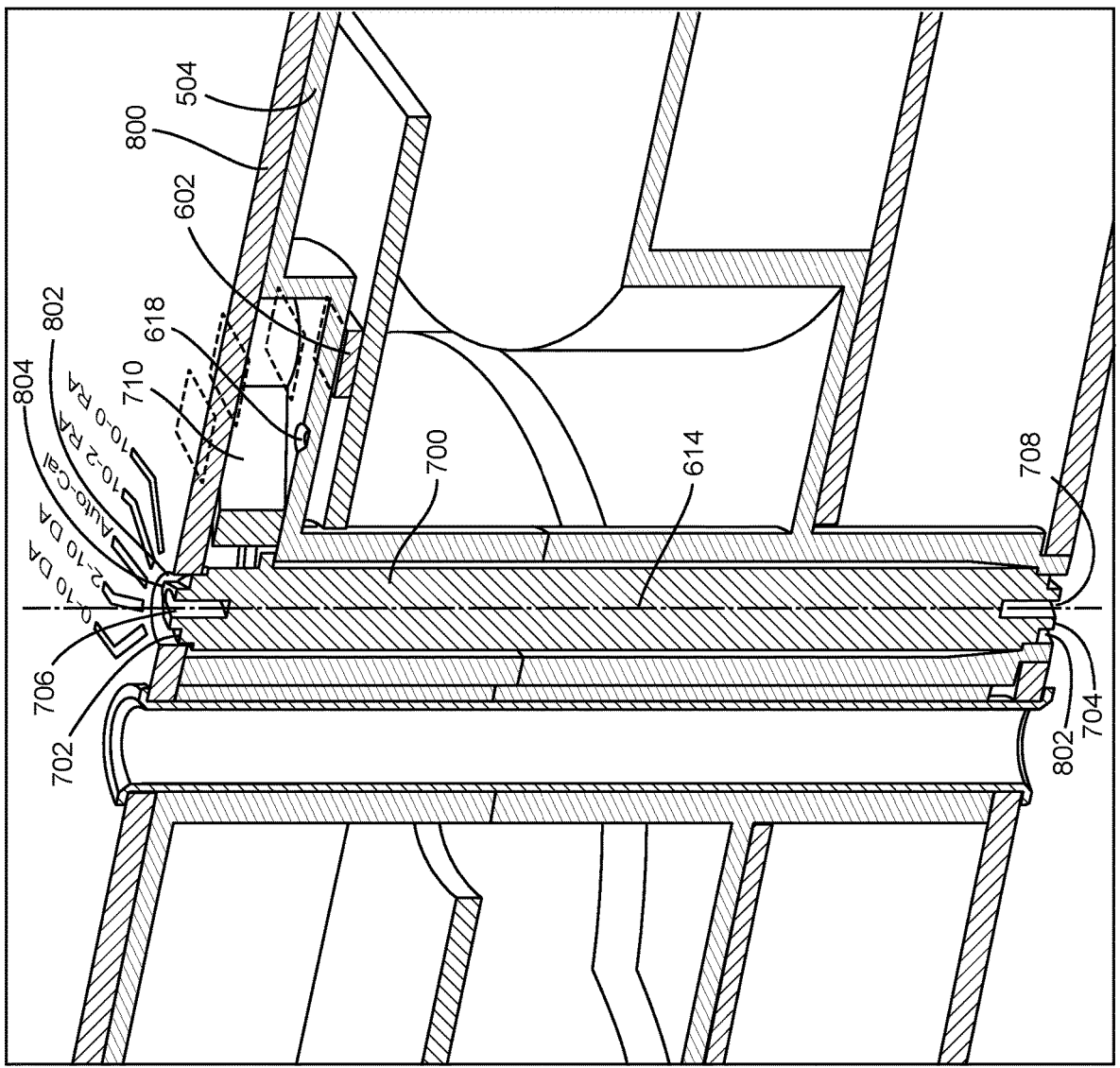
FIG. 8 is a cross-sectional view of the actuator of FIG. 5 and user input device of FIG. 7, according to an exemplary embodiment.

Referring now to FIG. 8, a cross-sectional view of user input device 512 is shown. In this example, arm 710 is sandwiched between the first side 504 of housing 502 and a cover 800. Cover 800 may include an aperture 802 for accessing the first end 702 of post 700. Cover 800 may include text indicating a number of settings for the actuator 500 (e.g., 0-10 DA, 2-10 DA, Auto-Cal, 10-2 RA, and 10-0 RA). While these settings are shown, a number of different settings may be provided on cover 800. In some embodiments, the first end 702 may include an indicator 804 that indicates which setting is being selected through rotation of post 700. In some embodiments, cover 800 may also cover the second side 506 of housing 502. In embodiments such as these, another aperture 802 may be provided in cover 800 for accessing the second end 704. Cover 800 may include text for indicating the settings adjacent to the second end 704 of post 700. The second end 704 may also include an indicator similar to indicator 804. Accordingly, a user may be able to see which setting is being selected for actuator 500 from both sides (e.g., first and second sides 504-506) of actuator 500.

Each of these settings may correspond to a respective detent 618 formed in the exterior-facing surface of the first side 504. As shown, post 700 (and, correspondingly, arm 710) may be rotated about axis 614 through engaging a tool into one of the notches 706, 708 and rotating the tool. As post 700 rotates about axis 614, tab 720 may then be engaged to one of the detents 618, and magnet 604 may be positioned above a magnetic field sensor 602 corresponding to the detent 618.

Referring back to FIG. 6, a second set 620 of magnetic field sensors 602 may be associated with user input device 514. In this embodiment, the second set 620 may be linearly arranged along circuit board 600. Similarly, a plurality of magnets 604 may be linearly arranged along user input device 514. Each magnet 604 may be retained in a slotted portion 622 extending width-wise within user input device 514. As one example, a first magnet 604a may be retained in slotted portion 622a. The first magnet 604a may be positionable within slotted portion 622a at a first position (e.g., "ON" position), or in a second position (e.g., "OFF" position). Similar examples may be provided for the remaining magnets 604. Accordingly, each magnet 604 may be positionable in either the first or second position. When all magnets 604 are selectively positioned by a user, magnets 604 may be used to generate a binary code (e.g., based on their presence/absence as detected by their corresponding magnetic field sensors 604).

In one or more embodiments, each magnetic field sensor 602 may be associated with a respective magnet 604 of the plurality of magnets 604. When user input device 514 is fully retained in slot 516 (e.g., where an end of user input device 514 abuts an end of slot 516), each magnetic field sensor 602 may be aligned with a corresponding slotted portion 622 that retains the magnet 604. In some implementations, each magnetic field sensor 602 may be linearly aligned along the first position (e.g., "ON" position) of user input device 514 when user input device 514 is positioned within slot 516. Accordingly, when magnets 604 are positioned in the first position within their respective slotted portion 622, the corresponding magnetic field sensors 602 may generate a signal indicating their presence. In some implementations, each magnetic field sensor 602 may be linearly aligned along the second position (e.g., "OFF" position) of user input device 514 when user input device 514 is positioned within slot 516. Accordingly, when magnets 604 are positioned in the first position within their respective slotted portion 622, the corresponding magnetic field sensors 602 may generate a signal indicating their absence (or, alternatively, will not generate any signals). While these implementations have been described, the present disclosure is not limited to these implementations. To the contrary, various combinations of locations of magnetic field sensors 602 with respect to their corresponding slotted portion 622 of user input device 514 may be implemented without departing from the scope of the present disclosure.

Settings Generation Process

Figure 9:
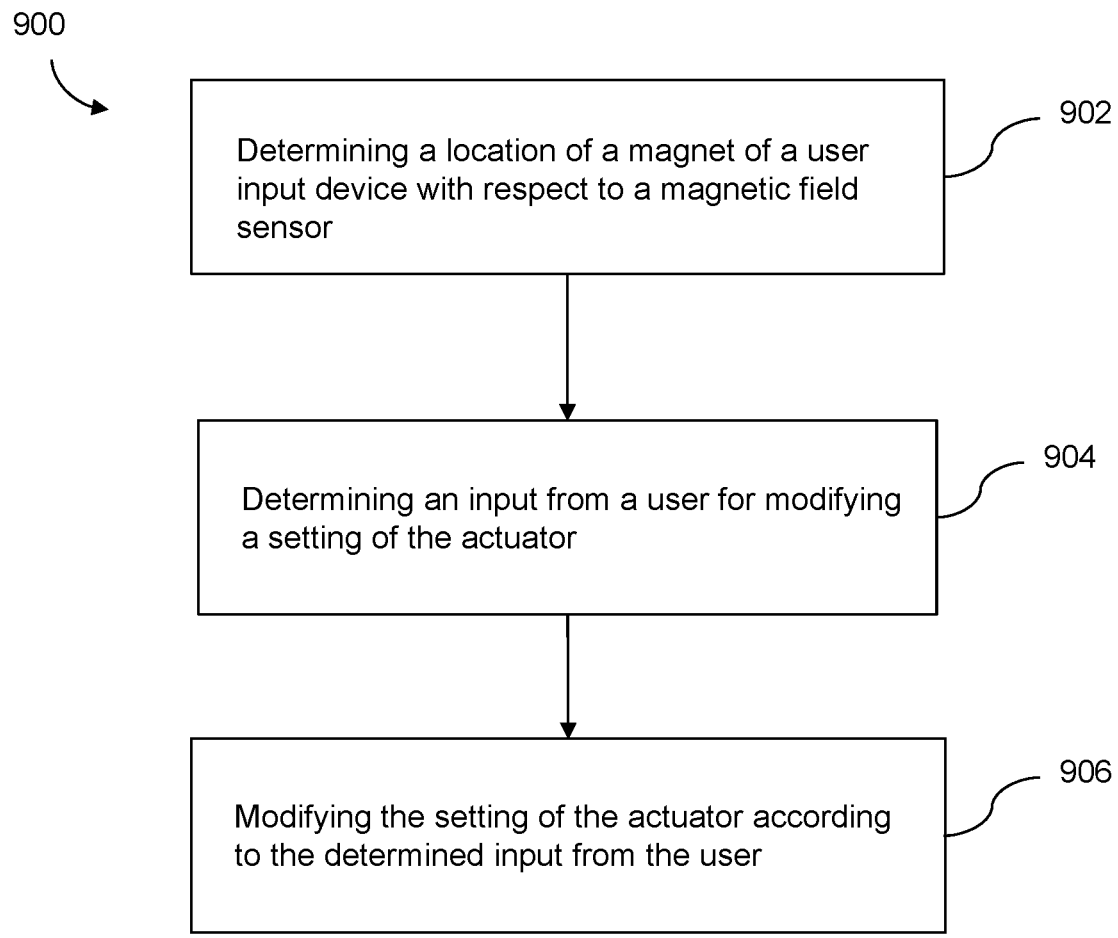
FIG. 9 is a flowchart of a process for generating a setting for actuator, according to an exemplary embodiment.

Referring now to FIG. 9, a flowchart of a process 900 for generating a setting for actuator 500 is shown, according to an exemplary embodiment. Process 900 may be performed by actuator controller 606. As shown in FIG. 8, BLDC motor 550 may be implemented within actuator 500. A microcontroller such as actuator controller 606 may particularly be configured to cause the steps of process 900 to be executed. However, it should be appreciated that solid state electronic circuitry may be provided to perform the steps of process 900 in place of a microcontroller.

Process 900 is shown to include determining a location of a magnet 604 of a user input device 512, 514 with respect to a magnetic field sensor 602 (step 902). Magnetic field sensor 602 may generate data corresponding to the presence of magnet(s) 604 adjacent to magnetic field sensor 602. In some embodiments, user input device 512, 514 may include a plurality of magnets 604. In some implementations of these embodiments, each of the plurality of magnets 604 may be associated with a particular magnetic field sensor 602. In other embodiments, user input device 512, 514 may only include one magnet 604. In both of these embodiments, each of the magnetic field sensor(s) 602 may be located inside housing 502 of actuator 500. In some implementations, magnetic field sensor(s) 602 may be linerally arranged along a circuit board 600. In other implementations, magnetic field sensor(s) 602 may be radially arranged about an axis 614. Magnets 604 may be retained in user input devices 512, 514. Additionally, magnets 604 may be located outside of the interior of housing 502. For instance, magnets 604 and magnetic field sensors 602 may be positioned along opposite surfaces of a side of housing 502, with magnetic field sensors 602 located inside housing 502. Accordingly, magnets 604 may be located adjacent to an exterior-facing surface of a side of housing 502, and magnetic field sensors 602 may be located adjacent to an interior facing surface of the same side of housing 502. Magnetic field sensors 602 may generate data corresponding to the presence (or absence) of magnets 604. In one or more embodiments, actuator controller 606 may determine the location of magnets 604 via magnet locator 608. Each magnetic field sensor 602 may generate data corresponding to the presence/absence of a magnet 604. Based on the data generated by magnetic field sensor 602, actuator controller 606 may determine the location of magnet(s) 604.

Process 900 is shown to include determining an input from a user for modifying a setting of actuator 500 (step 904). In some embodiments, the input may be determined based on the determined location of magnet(s) 604. For instance, a user may move one or more of magnets 604 to different locations. Each of these movements may be associated with a desired setting. As one example, the user may rotate user input device 512 to a location associated with a desired setting. As another example, the user may slide one or more magnets 604 within the respective slotted portion 622 of input device 514. Each of these movements may correspond to a different user input.

In one or more embodiments, the setting may be at least one of an address setting, a direct acting option, a reverse acting option, a zero-to-ten direct current voltage control, a two-to-ten direct current voltage control, and a mode for an auto-calibration cycle of actuator 500. In some implementations, at least some of these settings may be selected by the user on of the user input devices (e.g., user input device 512, for instance), and some of these settings may be selected by the user on the other user input devices (e.g., user input device 514, for instance). In some implementations, actuator 500 may include additional/alternative user input devices.

In some examples, particularly those where the setting is an address setting, magnet 604 may be one of a number of magnets 604. In these examples, each magnet 604 may correspond to a particular magnetic field sensor 602 (e.g., in the second set 620 of magnetic field sensors 602). In these examples, the user input may be an address to set for actuator 500. The address may be determined by actuator controller 606 via settings generator 610. For instance, actuator controller 606 may determine the presence or absence of each of the number of magnets 604 with respect to their corresponding magnetic field sensor 602. Based on the presence or absence of each magnet 604, actuator controller 606 may identify a binary number (as one example, with presence indicating a "1" and absence indicating a "0"). The binary number may be used to identify the address provided by the user.

In some examples, particularly those where the setting is one of a direct acting option, a reverse acting option, a zero-to-ten direct current voltage control, a two-to-ten direct current voltage control, and a mode for an auto-calibration cycle, magnetic field sensor 602 may be one of a number of magnetic field sensors 602. Each magnetic field sensor 602 may be radially arranged about axis 614. In these examples, the location of magnet 604 may be determined by determining which of the magnetic field sensors 602 generates data corresponding to the presence of magnet 604.

Process 900 is shown to include modifying the setting of actuator 500 according to the determined input from the user (step 906). Actuator controller 606 may generate one or more settings for actuator 500 based on the location of magnets 604. As stated above, the settings can be or include a 0-10 direct acting (DA) mode, a 2-10 DA mode, a calibration (CAL) mode, a 2-10 reverse acting (RA) mode, and a 0-10 RA mode, a "24 VAC" position, a "120 VAC" position, a "230 VAC" position, an "Auto" position, an address setting, to name several possibilities. Each of these settings may be associated with particular locations of magnets 604 of user input device 512, 514. Actuator controller 606 may generate settings for actuator 500 via settings generator 610 based on the location of the magnets 604 as determined via magnet locator 608.

In examples where the user input is a binary number for an address, actuator controller 606 may set the address for actuator 500 to the binary number. In example where the user input is a desired setting (e.g., a one of a direct acting option, a reverse acting option, a zero-to-ten direct current voltage control, a two-to-ten direct current voltage control, and a mode for an auto-calibration cycle), actuator controller 606 may control actuator 500 to have the desired setting.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An actuator in a HVAC system, the actuator comprising:
   a housing comprising an interior-facing surface and an exterior-facing surface;
   one or more magnetic field sensors located within the housing and arranged adjacent to the interior-facing surface of the housing;
   a user input device retaining one or more magnets that are movable into multiple different positions along the exterior-facing surface of the housing; and
   an actuator controller comprising a processor and a non-transitory storage medium having instructions thereon that, when executed by the processor, cause the processor to:
     determine a location of the one or more magnets with respect to the one or more magnetic field sensors based on data generated by the magnetic field sensors; and
     generate one or more settings for the actuator based on the determined location of the one or more magnets.

2. The actuator of claim 1, wherein the one or more magnetic field sensors comprises at least one of a hall effect sensor or a reed switch.

3. The actuator of claim 1, wherein the user input device comprises:
   a post extending through the housing substantially perpendicular to the interior-facing surface and the exterior-facing surface, the post being rotatable about an axis extending through the post; and
   an arm located adjacent to an end of the post, the arm being rotatable about the axis.

4. The actuator of claim 3, wherein the arm further comprises:
   a tab selectively engageable with one detent of a plurality of detents formed into the exterior-facing surface of the side of the actuator, the one detent corresponding to the generated setting.

5. The actuator of claim 3, wherein the arm comprises:
   a retaining portion that retains a magnet of the one or more magnets, the magnet being rotatable about the axis by way of rotation of the arm.

6. The actuator of claim 5, wherein the magnetic field sensors are radially arranged at a distance from the axis corresponding to a distance between the magnet and the axis.

7. The actuator of claim 5, wherein the end of the post further comprises a notch usable to rotate the user input device about the axis.

8. The actuator of claim 7, wherein the end is a first end, the post further comprises a second end opposite the first end, and wherein the second end comprises a notch usable to rotate the user input device about the axis.

9. The actuator of claim 7, wherein the end further comprises an indicator that indicates which setting is being selected through rotation of the user input device about the axis.

10. The actuator of claim 1, wherein the user input device comprises:
    a carrier including a plurality of slots, each slot retaining a respective magnet of the one or more magnets.

11. The actuator of claim 10, wherein the carrier is releasibly retainable in a slot formed into the exterior-facing surface of the housing.

12. The actuator of claim 11, wherein the one or more magnetic field sensors are linearly arranged along at least a portion of the slot formed into the exterior-facing surface of the housing, each of the one or more magnetic field sensors corresponding to a respective magnet of the one or more magnets.

13. A method of modifying a setting for an actuator of a HVAC system, the method comprising:
    determining a location of a magnet of a user input device with respect to a magnetic field sensor based on data generated by the magnetic field sensor, the magnet being positioned adjacent to an exterior-facing surface of a housing of the actuator, and the magnetic field sensor being positioned within the housing and arranged adjacent to an interior-facing surface of the housing;
    determining an input from a user using the determined location of the magnet;
    selecting, from a plurality of settings of the actuator, a setting for the actuator based on the determined input from the user; and
    providing the selected setting to the actuator.

14. The method of claim 13, wherein the setting is at least one of:
    an address setting;
    a direct acting option;
    a reverse acting option;
    a zero-to-ten direct current voltage control;
    a two-to-ten direct current voltage control; and
    a mode for an auto-calibration cycle of the actuator.

15. The method of claim 14, wherein the setting is the address setting for the actuator, and wherein the magnet is one of a number of magnets and the magnetic field sensor is one of a number of magnetic field sensors, each magnet of the number of magnets corresponding to a respective magnetic field sensor of the number of magnetic field sensors.

16. The method of claim 15, wherein the input from the user is an address to set as the address setting for the actuator, and wherein the address is determined based on data generated by each of the number of magnetic field sensors corresponding to the presence of the respective magnet.

17. The method of claim 13, wherein the magnetic field sensor is one of a number of magnetic field sensors radially arranged about an axis, and wherein determining the location of the magnet comprises:
   determining the location of the magnet by determining which of the number of magnetic field sensors generates data corresponding to a presence of the magnet.

18. The method of claim 17, wherein the number of magnetic field sensors corresponds to the number of settings for the actuator.

19. The method of claim 18, wherein the number of magnetic field sensors is less than the number of settings for the actuator.

* * * * *